Jan. 15, 1946.  R. I. LOPEZ  2,392,990
SPECTACLE CONSTRUCTION
Filed Sept. 11, 1944
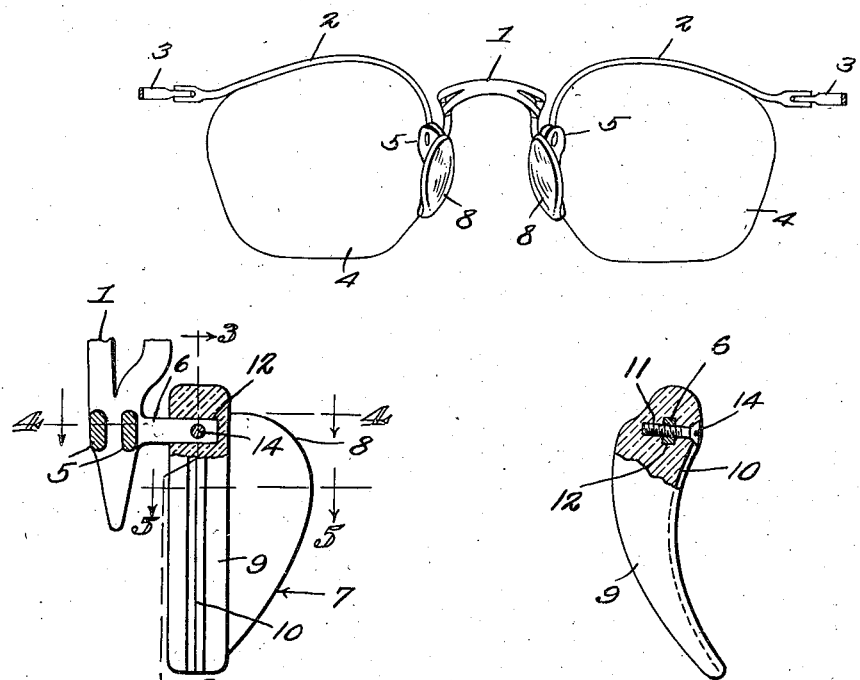
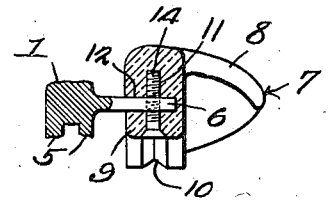
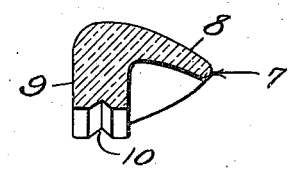
R. I. Lopez
INVENTOR.
BY
ATTORNEYS.

Patented Jan. 15, 1946

2,392,990

UNITED STATES PATENT OFFICE 2,392,990

SPECTACLE CONSTRUCTION

Rafael I. Lopez, Clarksdale, Miss.

Application September 11, 1944, Serial No. 553,608

2 Claims. (Cl. 88—48)

This invention aims to provide a novel pad for a pair of spectacles and to provide novel means for assembling the pad with the bridge of the spectacles.

The term "spectacles" is to be construed as including eye-glasses, and the frame structure may be of an appropriate sort.

Within the scope of what is claimed, the structure described and shown may be changed, without departing from the spirit of the invention.

In the drawing:

Figure 1 shows in rear elevation, a device constructed in accordance with the invention;

Figure 2 is a transverse section taken through the means whereby the pad is assembled with the bridge;

Figures 3, 4, and 5 are sections taken respectively on the lines 3—3, 4—4 and 5—5 of Fig. 2.

The improvement which characterizes the present invention may be used in connection with eye-glass frames or spectacle frames of any desired kind. By way of illustration, there is shown in the drawing, a spectacle frame which comprises a bridge 1, to which rims 2 are connected, temples 3 being pivotally assembled with the rims, the rims extending more or less about lenses 4, the lenses being connected at 5 to the bridge 1. Near its lower ends, the bridge 1 is supplied with rearwardly projecting fingers 6.

Nose pads 7 are provided, and preferably are made of zylonite, shell, a resinous plastic, or the like. The pads 7 are extensive enough so that they do not exert pressure on areas that are objectionably restricted.

Each pad comprises a thin concavo-convex body 8, provided along its entire forward edge with a laterally-outstanding reinforcing rib 9. The rib 9 is supplied along its outer edge with a superficial groove 10. At the upper end of the groove 10 a bore 11 is formed in the rib 9, the bore extending substantially parallel to the lens plane. The bore 11 is intersected by a recess 12, formed in the rib 9 and disposed at right angles to the lens plane.

The finger 6 of the bridge 1 is received in the recess 12 and is held therein by a securing element such as a screw 14, threaded into the bore 11 and extended through the finger 6 as Fig. 3 shows.

It will be noted that a simple but effective means is provided for holding the pad 7 fixedly but renewably and detachably on the finger 6. The groove 10 is useful, in that it serves to guide a screw driver (not shown) to the driving end of the screw 14. The rib 9 reinforces the pad 7 and strengthens it, especially as to reception of the anchorage means provided by the finger 6 and the screw 14.

The structure shown and described embodies a pad which will promote the comfort of the wearer and likewise be found convenient by the optician who is repairing or assembling an article of the spectacle or eye-glass type.

All portions of the finger 6 are disposed approximately at right angles to the bridge 1. The recess 12 extends but part way through the rib 9. The securing device is elongated in a direction parallel to the lens plane and terminates within the rib 9. There is no occasion for mounting an exposed nut or the like on the securing device.

What is claimed is:

1. In an article of the spectacle or eye-glass type, a bridge having a projecting finger, a nose pad comprising a body having a laterally-outstanding rib along its forward edge, the rib having a recess disposed transversely of the lens-plane of the article and receiving the finger, and a screw mounted in the rib and disposed approximately parallel to the lens-plane of the article and engaging the finger, the rib being provided with an elongated superficial groove wherein the driving end of the screw is received, the groove being narrow enough to constitute a screw driver guide leading to the driving end of the screw.

2. In an article of the spectacle or eye-glass type, a bridge having a rearwardly-projecting finger, all portions of which are disposed approximately at right angles to the bridge, a nose pad comprising a body having a laterally-outstanding rib along its forward edge, the rib having a recess extended partway therethrough and disposed transversely of the lens plane of the article and receiving the finger, and a securing device elongated in a direction substantially parallel to the lens plane of the article, the securing device being mounted in the rib and engaging the finger, and terminating at its inner end within the rib.

RAFAEL I. LOPEZ.